May 23, 1967  C. L. SEARLE  3,321,613
MEASURING INSTRUMENT

Filed Sept. 19, 1961  3 Sheets-Sheet 1

Inventor
Campbell L. Searle

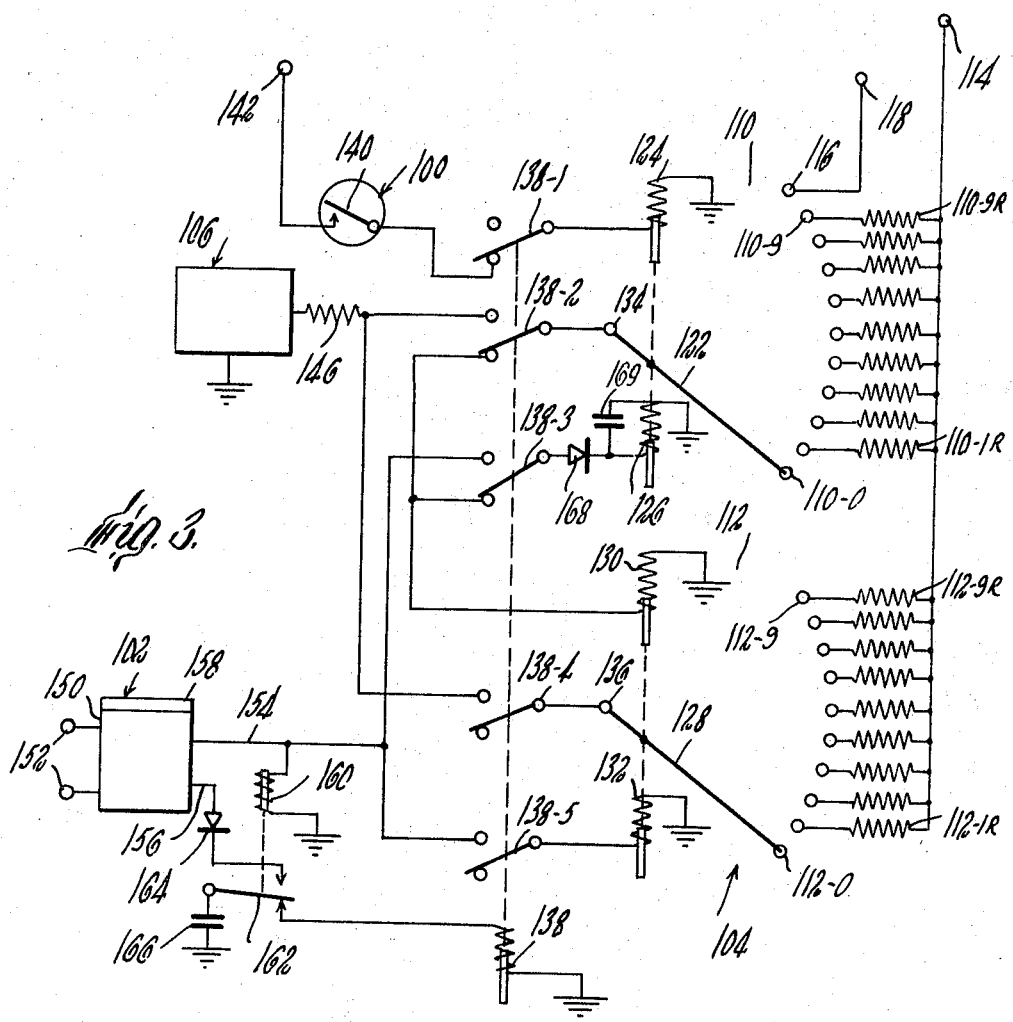
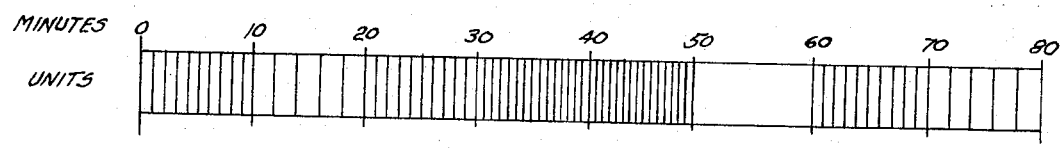
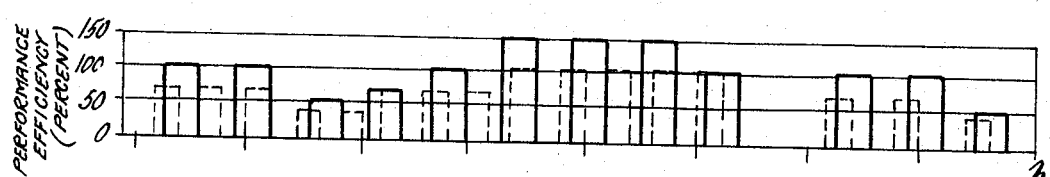

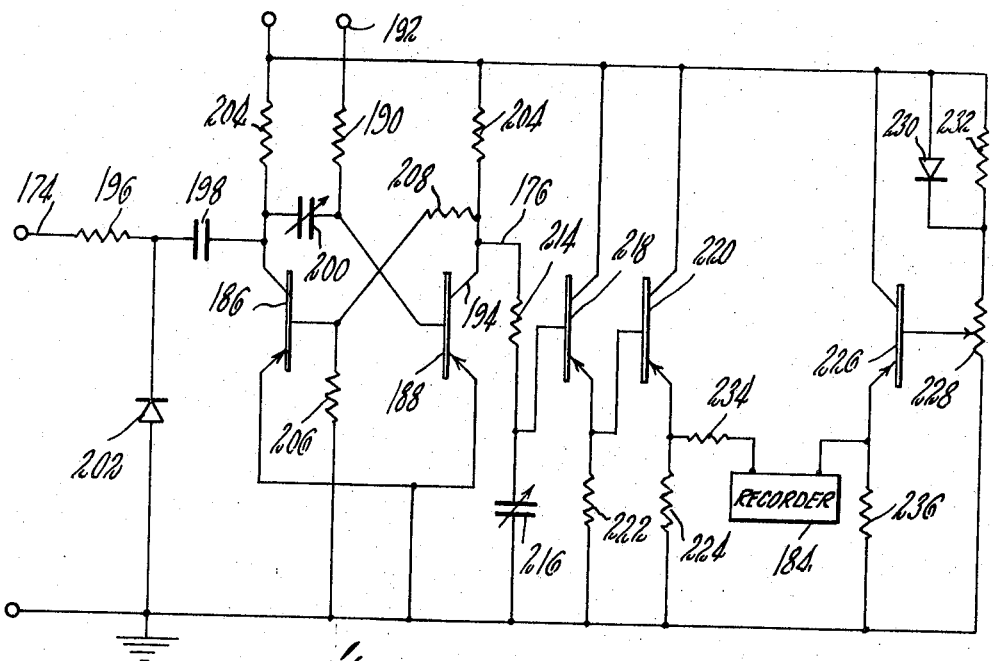
Fig. 5.
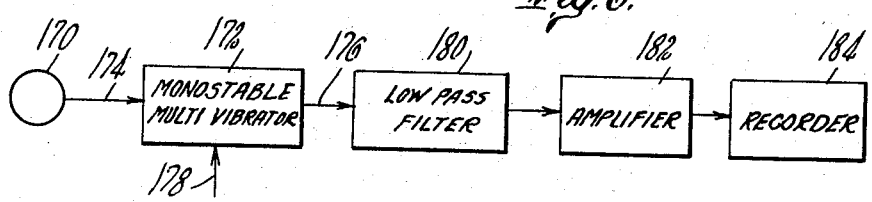
Fig. 6.
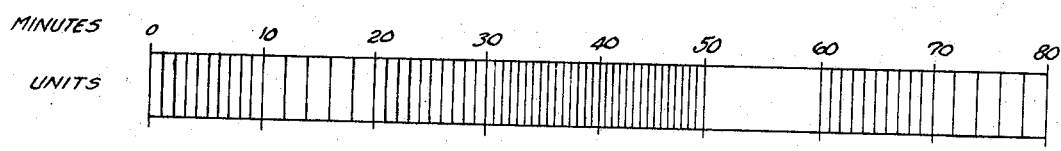
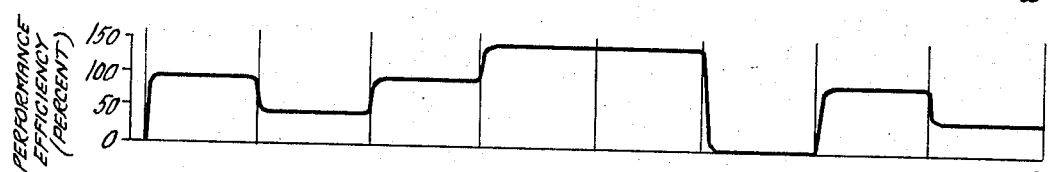
Fig. 7.

United States Patent Office 3,321,613
Patented May 23, 1967

3,321,613
MEASURING INSTRUMENT
Campbell L. Searle, Weston, Mass., assignor to Automation Management Incorporated, Westboro, Mass., a corporation of Massachusetts
Filed Sept. 19, 1961, Ser. No. 139,109
17 Claims. (Cl. 235—184)

This invention relates to measuring apparatus and more particularly to instrumentation particularly adapted to compute and provide a record of actual performance as a function of pre-established standard performance criteria for use as a management tool.

Information concerning the rate or efficiency at which an operation is being performed is often desirable, as for example by management in controlling production, in determining whether a particular operation is being performed in an expeditious manner, in detecting bottlenecks or unexplained slowdowns which occur during a series of operations, and as general supervisory information. A means for obtaining such information is the time study, but that operation is often difficult in application, expensive in terms of the manpower required for performance, and oftentimes unreliable due to facets of the operation being observed and to the fact that such observations can be only sporadic at best. Various types of performance supervising equipment have been proposed to overcome the limitations of the time study method but such equipment is, in general, either standard recorders or similar devices, or complex and expensive apparatus which require a considerable amount of maintenance and frequently their output does not provide reliable information. Such apparatus have not been particularly suitable for furnishing performance or machine utilization data over predetermined periods which enable management to have increased knowledge of and confidence in the supervised operation.

Accordingly, an object of the invention is to provide a simple, inexpensive and reliable apparatus for supervising performance and to provide a record of the efficiency of the actual performance as a function of a standard performance.

Another and more general object of the invention is to provide a novel and improved measuring apparatus for providing an indication of an input quantity as a function of a base quantity than can be easily varied over a wide range.

Another object of the invention is to provide a novel performance computer capable of easy adjustment to accommodate various rates of standard performance and to provide an accurate record of the actual performance as a function of the specified standard performance.

Still another object of the invention is to provide improved performance sensing apparatus which is versatile in application and provides accurate information concerning immediate and overall performance of the supervised operations.

In accordance with principles of the invention there is provided a performance sensing system for computing an analog output indicative of actual performance as a function of a predetermined standard performance which includes sensor means for providing a digital indication of actual performance being supervised by the sensing system, means for producing a predetermined standard performance manifestation as a function of time, means for combining the standard performance manifestation and the digital indication provided by said actual performance sensor to produce a modified performance indication in analog form and means to record the modified indication in relation to time for providing a record of the analog output in the form of performance efficiency information. In a first embodiment of the invention described in greater detail hereinafter, a voltage network is utilized and a voltage produced by that network is sensed so that a continually modified indication of the total actual performance as compared with a standard performance value results. A similar network may be employed in conjunction with the totalizing network to provide performance rate indications. The totalizing network includes two potentiometers, the variable arm of one being driven at a fixed rate as a function of an indicated standard performance and the variable arm of the other being driven in response to digital input pulses as a function of the actual performance that is being supervised and its output is a cumulative record of performance efficiency. In a second disclosed embodiment of the invention there are provided a series of counters which sum actual performance indications and, in combination with timing circuitry adjusted to a standard performance quantity, perform an actual performance data modifying function. The counters respond to the digital input signals in step fashion with a periodic readout and resetting of the counters to provide an indication of performance efficiency. The timing interval for sampling actual performance rate is adjusted as a function of the pre-established standard performance rate and enables flexible accommodation of a wide range of standards. In still another disclosed embodiment of the invention an adjustable monostable multivibrator-low pass filter arrangement is utilized for sampling actual performance indication as a function of standard performance, and providing an output indication of the performance efficiency. This embodiment, as do all the other disclosed embodiments, includes provision for easily varying the standard performance value that is to be combined with the actual performance indication and affords a direct and immediate indication of performance efficiency. The invention thus provides, in a variety of embodiments, flexible, easily adjusted, simple and inexpensive digital to analog conversion instrumentation for calculating and recording performance and performance rate which can easily be integrated into a variety of types of systems. For example, the apparatus may provide performance information which are utilized for improving production line operations, it may provide machine utilization records used in rental billing, and it is capable of serving many other management needs in a useful manner. While the invention has particular use in measuring performance efficiency it provides in a more general sense a versatile counter or tachometer, the output of which is easily adjusted to accommodate different operating ranges of significant interest, and is of use in diverse counting operations, where the relation of the actual quantity to a base quantity is of significance.

Other objects, features and advantages of the invention will be seen as the following description of several embodiments thereof progresses, in conjunction with the drawings, in which:

FIG. 3 is a schematic diagram of a second embodiment of a performance rate computation apparatus constructed in accordance with principles of the invention;

FIG. 4 is a set of diagrams indicating the form of output record provided by the apparatus shown in FIG. 3, based on the operation diagrammed in FIG. 2;

FIG. 5 is a schematic diagram of still another embodiment of the performance computation apparatus constructed in accordance with principles of the invention;

FIG. 6 is a block diagram of the performance computation apparatus shown in FIG. 5; and FIG. 7 is a set of diagrams indicating the form of output records provided by the apparatus shown in FIG. 5, based on the operation diagrammed in FIG. 2.

Figures 1, 2:
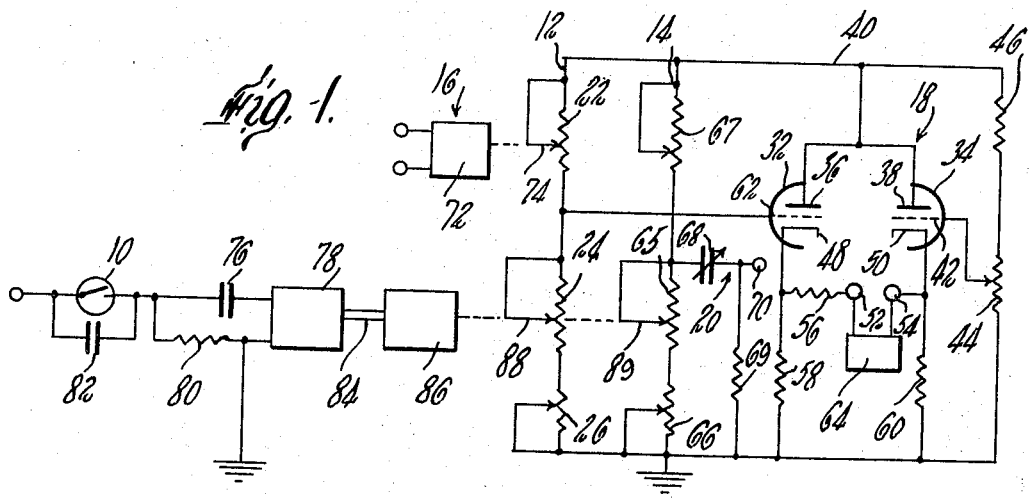
FIG. 1 is a schematic diagram of a performance computation apparatus constructed in accordance with a first embodiment of the invention.
FIG. 2 is a series of diagrams indicating an illustrative operation supervised by instrumentation constructed in accordance with principles of the invention, rate and total performance efficiency curves and forms of output records provided by the performance computation apparatus shown in FIG. 1.

The performance computation apparatus as shown in FIG. 1 includes an actual performance input sensor 10 which provides digital signals indicative of the actual performance to corresponding elements of two voltage dividing networks 12, 14. A time responsive performance standard control 16 applies appropriate signals to the voltage dividing network 12 and that network responds to the digital indication of actual performance and applies an analog output signal of the modified digital input to associated output circuitry 18 for providing a record of the resulting analog signal. Voltage dividing network 12 includes a first potentiometer section 22, a second potentiometer section 24 and a starting point adjust potentiometer 26 connected in series. The junction between the potentiometer sections 24, 26 is connected to a vacuum tube recording circuit 18.

That recording circuitry includes two vacuum tube triode sections 32, 34 which have their anodes 36, 38 respectively connected to the high voltage line 40. The grid 42 of triode 34 is connected to a zero adjust potentiometer 44 which is connected in series with a load resistance 46 and is utilized for zeroing the output indication of the metering circuit. Connected across the cathodes 48, 50 of the triodes 32, 34 in a metering circuit which has terminals 52, 54 and a calibrating resistor 56 connected in series therewith. Cathode resistors 58, 60 are connected between the cathode and ground. The output potential from the voltage divider network 12 is applied to the grid 62 of triode 32 and an indication of the voltage at that point is applied to a suitable recording apparatus 64 such as a Rustrak recorder at terminals 52, 54.

Network 14 includes a main potentiometer 65 corresponding to potentiometer 24, a corresponding starting point adjust potentiometer 66, and a standard performance fine adjustment potentiometer 67. Connected to the junction between potentiometers 65 and 67 is a differentiator circuit including an adjustable capacitor 68 and a resistor 69 whose output is applied to terminal 70, to which appropriate indicating circuitry may be connected. Through coordination of the time constant of the RC circuitry with the standard rate of performance that is being supervised, this circuitry provides periodic signals at terminal 70 indicative of the performance rate efficiency of the operation being supervised.

The time responsive standard performance control 16 includes a timing motor 72 which is supplied with 110 volt 60 cycle power to drive the arm 74 of potentiometer 22 at a constant rate so that the arm will traverse a substantial portion of the working length of potentiometer 22 during the time period that preformance efficiency is to be measured (for example, an eight hour period).

The circuitry associated with the ganged potentiometers 24 and 65 is responsive to signals from the actual performance sensor 10. When the sensor, which may be a limit switch, a photoelectric cell, an ultarsonic sensor, a proximity switch, an air switch, vibration pick up, radioactivity sensor, etc., provides a digital signal indicative of actual performance that signal is coupled by capacitor 76 to a step motor 78. Resistor 80 and capacitor 82 furnish appropriate electrical circuit parameters so that a signal of proper magnitude and duration is provided for operation of the step motor 78. The step motor turns an output shaft 84 which drives an adjustable ratio drive unit, such as a continuously variable ball and disc type of step down ratio adjustable gearing unit 86, the output of which in turn drives the movable arm 88, 89 of the potentiometers 24, 65 in accordance with the actual performance input signals supplied by the sensor switch 10. Adjustment of the movable element drive gearing unit 86 effectively varies the standard performance criterion, that is, increasing the input-to-output step down gear ratio increases the standard performance unit value and vice versa. While the standard performance unit could alternatively be adjusted through control of the output of timing motor 72 the preferred arrangement as illustrated is more accurate over a fixed sampling period as it enables full use of potentiometer 22 and also enables a finer and more economical control of the time base for the standard performance quantity.

In FIG. 2 there is shown an illustrative cycle of performance (FIG. 2a) in which each vertical mark represents ten units. Thus in the first ten minutes, there was a count of one hundred units and in the next ten minutes there was a count of fifty units, etc. FIG. 2b indicates the total or overall performance efficiency of the operation diagrammed in FIG. 2a in units per minute (overall average), and FIG. 2c indicates the record that would be produced by recorder 60 assuming a standard performance of ten units per minute. FIG. 2d is a graph of rate of performance and FIG. 2e indicates a typical output of the differentiating circuitry at terminal 70. (It will be understood that there are small transients of a continuing nature due to the RC circuitry which transients would have a minor effect on the output but the scale of the output as illustrated is too small to fairly indicate these minor aberrations.)

The apparatus associated with voltage divider network 12, in operation, computes the actual performance being supervised as a function of a pre-established standard performance and provides an output graphical representation (FIG. 2c) which may be considered to be a plot of cumulative or overall performance efficiency of an operation versus time. There is an initial starting transient as indicated in FIG. 2c but after that transient the record indicates 100% efficiency during the first ten minutes. During this interval the timing motor 72 is driving the potentiometer element 74 at a rate corresponding to the rate motor 78 steps elements 88 and 89 so that the voltage applied to the vacuum tube circuitry 18 is constant and is indicated on the output graph as a horizontal line. During the next ten minute interval performance decreased to 50% of standard performance. The output voltage and the integrated output indication, as shown in FIG. 2c, decreases according to the overall performance and at the end of twenty minutes indicates a total performance efficiency of 67%. The operation continues to adjust the output voltage so that at the end of eighty minutes a total performance efficiency of 87% is indicated, due to the modification of the actual values by a standard performance value in the adjustable ratio drive unit 86 and as a function of time introduced by motor 72. Any point of the record (FIG. 2c) indicates the total actual performance (from time 0) in terms of standard performance at that instant of time and the end point indicates the cumulative actual performance in those terms. The potentiometer 22 in the preferred embodiment has a value of 500 kilohms and the potentiometer 24 has a value of 5,000 ohms. As $R_{22} \gg R_{24}$ the voltage at the junction is approximately equal to $R_{24}/R_{22}$ and thus that voltage indicates the ratio of actual performance (setting of $R_{24}$) to standard performance (setting of $R_{22}$). As indicated above, in order to change the standard performance value the time base is adjusted, not by adjusting the timing motor 72 but rather the gearing unit 86 so that the rate of advance of the sliders 88 across the potentiometers 24 and 65 is changed without affecting the timing in the recording system.

The differentiator circuit associated with network 14 provides an inexpensive rate of performance efficiency indication to be obtained in conjunction with a cumulative indication provided by network 12. The actual rate is graphically indicated in FIG. 2d and the indication provided at terminal 70 is shown in FIG. 2e. As the time constant of the differentiator circuit is long compared with the interval between advances of element 89 on potentiometer 65 a relatively smooth record results. The signal applied to the differentiator circuit is staircase in shape, the riser height being a function of standard performance and the space between risers being a function of actual performance.

An embodiment of the invention which directly provides an efficiency rate indication is shown in FIG. 3. This embodiment also includes an actual rate sensor 100; a time responsive standard performance rate control 102; actual and standard performance rate combining circuitry 104 and a recorder 106. The arrangement employs two decade counters 110 and 112, each of which has ten terminals, 110-0, 9 and 112-0, 9 which are connected by graded resistors 110-1R, 9R and 112-1R, 9R to a source of regulated voltage 114. Associated with decade counter 110 is a conductive member, diagrammatically indicated as an arm 122 which is operated by a relay coil 124 to advance the arm 122 upwardly in stepwise fashion through the set of contacts 110-0, 9 and by a reset relay coil 126 to reset the conductor 122 to the position shown in FIG. 4. Similarly, there is associated with the conductive arm 128 of decade counter 112 a stepping relay coil 130 and a resetting relay coil 132. The terminals 134, 136 of the decade counters are connected through switch sections 138-2 and 138-4 of the master control relay 138. That relay operates switch sections 138-1, 5 for ganged movement between a lower (monitor) position and an upper (record) position as shown in FIG. 3. This master control relay 138 may be a rotary switch relay or other suitable device operating in the desired manner. Switch section 138-1 connects the stepping relay 124 of decade counter 110 to switch 140 of the actual performance rate sensor 100, when the control relay contacts are in their lower positions, so that a relay operating signal is applied from terminal 142 to the stepping relay in response to each sensed actual performance operation. The recorder 106 is connected to the readout terminals of the decade counters 134, 136 by switch sections 138-2 and 138-4 when the relay contacts are in the upper positions and the voltage indication is applied from both decade counters through the common resistor 146 to the recorder.

The standard performance rate control 102 includes a timing circuit 150 operated by the conventional 110 volt A.C. signal applied at terminals 152. This timing circuit 150 applies an output voltage level on line 154 and 156 at pre-established time intervals in accordance with the standard performance rate value, which is adjustable and may be dialed into the timer circuitry 150 by a conventional mechanism indicated generally by block 158. The resultant periodic output signal on line 154 energizes control relay 160 to raise contacts 162 (and also to operate reset relays 126 and 132 when the switch sections of master relay 138 are in the upper positions). When the relay 160 is energized and the contacts 162 are picked up, the signal on line 156 is applied through diode 164 to charge capacitor 166. At the termination of the signal on line 154 the relay is de-energized, dropping contacts 162 to complete the circuit between capacitor 166 and relay coil 138 so that the capacitor discharges and the voltage applied thereto operates the coil of relay 138 to move the switch sections 138-1, 5 associated therewith. It will be understood that the switch sections are moved to the upper position in response to one output cycle from the timer 150 and to the lower position in response to the next output cycle from the timer.

With the circuitry in the position shown in FIG. 3 as the sensor switch 140 is operated voltage pulses are applied to relay coil 124 to step the arm 122 through the decade contacts 110-0, 9. On reaching the last contact 116 a 110-volt signal is applied from terminal 118 through arm 122, terminal 134 and switch section 138-2 to operate the stepping relay 130 of decade counter 112 and also through switch section 138-3 and the delay circuit (which include diode 168 and capacitor 169) to operate the resetting relay 126 of decade counter 110 and reset arm 122 to the position shown in FIG. 3. This stepping operation in response to actual performance signals continues until the output signal of timing circuit 150 on line 154 releases relay 160 (after first picking up relay 160 to enable charging of capacitor 166) so that the capacitor voltage operates relay 138, moving the switch contacts to the upper position. In this switch position the sensor switch 140 is disconnected from the combining circuitry and the recorder 106 is connected thereto. Two currents as determined by the positions of the arms 122 and 128 at that time are applied from terminal 114 through two of the graded resistors 110-R and 112-R and resistor 146 to operate the recorder and provide an indication of the actual number of operations in the performance being supervised during the sampling interval. The values of the components are selected so that fifty-five operations of switch 140 during any sampling interval would produce a performance indication of 100%. As the interval of output cycles of timer 150 is adjustable the sampling interval is set so that the desired number of stepping operations will be recorded by the decade counters if the actual performance being sensed occurs at the normal rate during each sampling period.

When the timer 150 produces the next pulse on line 154 relay 160 is again picked up (enabling capacitor 166 to charge) and at the same time the signal is applied to the switch sections 138-3 and 138-5 to reset the decade counters. When the relay 160 drops out capacitor 166 is discharged through contacts 162 and steps the relay 138 to place the switch sections in the lower position so that a sampling cycle is again initiated. A typical graph of the record produced by this circuitry is shown in FIG. 4b. The operation which is being measured by this graph is the same as that discussed above in conjunction with the graph shown in FIG. 2 and a corresponding reference diagram is shown in FIG. 4a. In FIG. 4b records of two different standard performance values are shown: ten units per minute (solid lines) and fifteen units per minute (dotted lines). It will be understood that the sampling periods may be varied as desired commensurate with the actual and standard performance values and the values shown in FIG. 4 have been chosen for clarity of illustration. The recorded value is an indication of the actual rate of performance as a function of standard performance during each sampling interval. Thus, for a ten unit standard performance 100% performance is recorded as occurring during the 0-3, 6-9, 24-27, 48-51, 60-63 and 66-69 minute intervals; while for a fifteen unit standard performance 100% performance was recorded as occurring only during the intervals 32-34, 36-38, 40-42, 44-46 and 48-50. It will be noted that the 100% performance restored during the interval 48-51 minutes on the ten unit standard was actually two minutes of 150% efficiency and one minute of 0% efficiency. By making sampling periods more frequent minor aberrations in performance may be detected but for many purposes comparatively gross sampling periods are sufficient.

A schematic diagram of another embodiment of performance rate computation apparatus constructed in accordance with principles of the invention is shown in FIG. 5 and a block diagram of that apparatus is shown in FIG. 6. Signals indicative of the actual performance being monitored are produced by a suitabl sensor 170 and applied to the combining circuitry 172 which in this embodiment includes a monostable multivibrator. That multivibrator has two states, a stable state and an unstable state. The circuit is initially in its stable state and an input pulse on line 174 from the sensor 170 causes the circuitry to switch from its stable state to its unstable.

state, and in the unstable state the circuitry produces an ouput pulse signal on line 176. After a preestablished time interval the circuitry automatically switches back to its stable state. The duration of the output pulse is determined by time constant coupling circuitry within the multivibrator and is adjustable by appropriate manipulation of components in the coupling circuitry. Selection of a standard performance rate through adjustment of the time constant coupling circuitry (diagrammatically indicated as line 178 in FIG. 6) adjusts the width of the output pulse produced in response to actual performance signals. Effectively this combining circuit arrangement weights each actual performance signal as a function of the pre-established standard performance rate. This output is applied to an RC low pass filter 180 and the output of the filter applied through amplifier circuitry 182 to a suitable output such as a recorder 184.

With reference to FIG. 5 the monostable multivibrator 172 includes two cross-coupled PNP transistors 186, 188. In the stable state the current flowing through resistor 190 from a −22 volt source at terminal 192 holds transistor 188 in conducting state and the resulting low voltage in the collector 194 at transistor 188 holds the transistor 186 off. When a positive input pulse is applied on line 174 through resistor 196 and capacitor 198 to the collector of transistor 186, the transition is coupled by capacitor 200 to the base of transistor 188 turning that transistor off. The resulting increase in voltage at its collector 194 turns transistor 186 on and maintains the input voltage on its collector until transistor 188 turns on again. When transistor 188 is turned off an output pulse is applied to the signal on line 176. The duration of the output pulse is controlled by the time constant circuitry including adjustable capacitor 200 and resistor 190. When the capacitor 200 is discharged sufficiently to permit turn on of transistor 188 output signal on line 176 terminates and the circuit returns to its stable state.

The output signal of the multivibrator is a rectangular pulse having rise and fall times in the order of 5 microseconds. The value of the adjustable capacitor 200 may be varied over a wide range. Values up to 10 microfarads have been used employed in the circuitry which yield an output pulse width of approximately 1 second. The lower limit in pulse widths if primarily a function of the physical size, reliability and stability of the capacitor 200. The circuitry has been operated at pulse rates up to 1000 pulses per second with a capacitor value of 0.0001 microfarad resulting in an output pulse width of 95 microseconds.

The low pass filter 180 includes a resistor 214 and a capacitor 216. The capacitor of this filter charges exponentially to the time average value of the multivibrator output waveform and in the described embodiment this RC combination has a time constant of about 21 seconds. Its output thus is a function of both the output pulse width and the repetition frequency of the output pulses. The output of the filter is monitored by amplifier circuitry 182 in the form of a high input impedance voltmeter circuit which includes PNP transistors 218, 220 which circuit includes negative feedback introduced by resistors 222 and 224 of a magnitude sufficient for the linearity of the voltmeter circuit to equal that of the recording or other monitoring apparatus 184. A fifth transistor 226 is employed to balance out any undesired output signal caused by transistor $I_{co}$ current flow. Its output is varied by the zero adjust potentiometer 228. Diode 230 also serves to minimize errors due to temperature variations since the back bias current in the diode 230 varies with temperature in a manner similar to the $I_{co}$ variations in the transistors.

The following are suitable values for circuit components utilized in one embodiment of this multivibrator circuitry:

Resistors: Ohms
190 — 270K
196 — 39K
204 — 6.8K
206 — 56K
208 — 220K
214 — 47K
222 — 47K
224 — 1.2K
228 — 50K
232 — 82K
234 — 6.8K
236 — 1.2K Capacitors: Microfarads
198 — 0.1
200 (adjustable) — 10
216 (adjustable) — 300

Diodes:
202 — 1N34A
230 — 1N91

Transistors:
186 — 2N404
188 — 2N404
218 — 2N508
220 — 2N508
226 — 2N508

A graphical indication of the signals produced by this circuitry is shown in FIG. 7 in response to the same illustrative performance as discussed in conjunction with FIGS. 2 and 4. That performance is indicated in FIG. 7a; and in FIG. 7b the output of the low pass filter 180 as recorded by a Rustrak recorder, for example, is shown. It will be noted that this recorded output is similar to the actual rate indication graphed in FIG 2d.

Thus it will be seen that the invention provides simple and inexpensive instrumentation for supervising performance in general and functions as a valuable management aid in providing immediately available information on performance efficiency. The apparatus of the invention easily accommodates a wide variety of different processes and performances, and the supervised performance may be recorded as a continuing cumulative value or as periodic samples of performance rate at selected intervals. In either case the record is an accurate, directly available function of a pre-established standard performance value. The apparatus of the invention is particularly versatile in that it is operative with numerous different types of actual performance sensors and includes adjustment means capable of easily varying over a continuous range the standard performance indication that is to be combined with the actual performance values in the modifying operation. The invention, in addition to use in supervising production may function in other applications for example as a versatile counter in tachometer applications or in the measurement of traffic. In all such uses the instrument features an output as a function of a readily adjusted standard or base quantity and thus the output can be easily correlated with significant criteria to provide a most meaningful result. While preferred embodiments of the invention have been shown and described, various modifications therein will be obvious to those having ordinary skill in the art and therefore it is not intended that the invention be limited to the described embodiments or to details thereof and departures may be made therefrom within the spirit and scope of the invention as defined in the claims.

I claim:
1. A performance sensing system for computing an output indicative of actual performance as a function of a predetermined standard performance comprising sensor means for serially providing digital indications spaced in time as a function of the actual performance supervised by said sensing system, means for providing a standard performance manifestation as a function of time, means for continuously combining said standard performance manifestation and the digital indications provided by said actual performance sensor to provide a modified performance indication, and means to record said modified performance indication as a function of time to provide actual performance efficiency information.

2. A performance sensing system for computing an analog output indicative of actual performance as a function of a predetermined standard performance comprising a sensor to provide successive electrical signals variably spaced in time, each signal being representative of each unit of actual performance supervised by said sensing system, electrical circuitry responsive to said actual performance signal to provide an output signal as a function of each said actual performance signal and a time-based standard performance manifestation, and a recorder adapted to continuously record said output signals as a function of time to provide actual performance efficiency information.

3. The system as claimed in claim 2 wherein said electrical circuitry includes a first voltage dividing network comprising two variable elements, a junction between said two variable elements and a voltage source connected across said network, means to vary one of said elements at a fixed linear rate in a predetermined direction and means to vary the other of said elements in a related direction in response to each said actual performance signal so that the voltage at said junction may be sensed to provide said output signal.

4. The system as claimed in claim 3 and further including adjustment means associated with one of said element varying means to control the rate at which said one element varying means varies the associated element, said adjustment beans being responsive to changes in said standard performance manifestation.

5. The system as claimed in claim 3 and further including a second voltage dividing network including an element adapted to be varied in response to each said actual performance signal, and a differentiating circuit including a capacitance and a resistance connected to said second network to provide an output signal providing rate of performance efficiency information.

6. The system as claimed in claim 2 wherein said electrical circuitry includes a monostable multivibrator having a stable state and an unstable state, said multivibrator being switched from said stable state to said unstable state in response to each said actual performance signal and producing in said unstable state and output signal of a duration that is a direct function of said standard performance manifestation.

7. A performance sensing system for computing an analog output indicative of actual performance as a function of a predetermined standard performance value comprising sensor means for providing a digital indication of the actual performance supervised by said sensing system, a counter responsive to said digital indications for summing said indications, adjustable means for periodically reading out the contents of said counter after predetermined periods of time, said predetermined periods of time being a function of said standard performance value and being adjustable in accordance with changing values thereof, means to reset said counter after each readout operation preparatory to another actual performance summing operation as a function of said standard performance value, and means to record said readout contents as a function of time to provide actual performance efficiency information.

8. The system as claimed in claim 7, said counter includes a plurality of graded resistor elements connected to a common voltage source and output of said counter is a current whose magnitude varies as a function of the number of digital indications applied thereto prior to said readout operation.

9. A performance sensing system for computing an analog output indicative of the actual performance of a supervised operation as a function of a predetermined standard performance value comprising a sensor to provide an electrical signal representative of each unit of actual performance in the operation supervised by said sensing system, output manifestation producing apparatus responsive to each said electrical signal applied thereto, adjustable means in said manifestation producing apparatus adapted to be adjusted as a function of said standard performance value to control the weight accorded each said output manifestation, means to apply said electrical signals to said apparatus, and means to sense the totality of said weighted output manifestations to provide an indication of the actual performance of the supervised operation as a function of said standard performance value.

10. The performance sensing system as claimed in claim 9 wherein said adjustable means operates said totality sensing means at time intervals that are a function of said standard performance value.

11. The performance sensing system as claimed in claim 9 wherein said output manifestation producing apparatus further includes means to apply a bias that is continuously varied as a function of time to modify the output manifestation produced in response to said electrical signals, and said adjustable means controls the magnitude of said bias.

12. A performance sensing system for computing an analog output indicative of actual performance as a function of a standard performance value comprising a sensor for providing a digital indication of the actual performance of the operation supervised by said sensing system, a voltage dividing network including two potentiometers connected in series, the resistance of one of said potentiometers being much larger than the resistance of the other of said potentiometers, a voltage source connected across said networks, means to adjust the resistance value of the first potentiometer continuously in a predetermined direction, and means to adjust the resistance value of the second potentiometer in the same relative direction in response to each said digital indication, the magnitude of each adjustment of said second potentiometer being a function of said standard performance value, so that the voltage at the junction between said two potentiometers provides an indication of actual performance efficiency.

13. The system as claimed in claim 12 wherein said means to adjust the resistance value of said second potentiometer includes a stepping motor having an output shaft, means to apply said digital indications to said stepping motor such that said output shaft is rotated a fixed amount in response to each applied digital indication, and an adjustable gearing element associated with said output shaft to control the magnitude of each adjustment of said second potentiometer.

14. The system as claimed in claim 13 and further including a second voltage dividing network including a variable element driven by said gearing element, a differentiating network connected to said variable element, said differentiating network including a resistance and an adjustable capacitance, said capacitance being adjusted as a function of said standard performance value, and means to provide an output from said differentiating network, which output provides periodic indications of the performance efficiency of the supervised operation.

15. A performance sensing system for computing an analog output indicative of the actual performance of a supervised operation as a function of a predetermined standard performance value comprising a sensor to provide an electrical signal representative of each unit of actual performance in the operation supervised by said sensing system, output pulse producing apparatus responsive to each said electrical signal applied thereto, circuitry in said pulse producing apparatus adapted to be adjusted as a function of said standard performance value to control the time duration of each said output pulse, means to apply said electrical signals to said apparatus, and means to sense the totality of said output pulses to provide an indication of the actual performance efficiency of the supervised operation.

16. A performance sensing system for computing an analog output indicative of the actual performance of a supervised operation as a function of a predetermined standard performance value comprising a sensor to provide an electrical signal representative of each unit of actual performance in the operation supervised by said sensing system, a monostable multivibrator having a pair of electrical signal translation devices, each said device having an input element and an output element, a cross-coupling circuit between an input element of each device and an output element of the other device, adjustable time constant circuitry in one of said cross-coupling circuits adapted to be adjusted as a function of said standard performance value so that said multivibrator circuitry produces an output pulse of a duration proportional to said standard performance value in response to each said electrical signal applied thereto, means to apply said electrical signals to said multivibrator, and means to sense the totality of multivibrator output pulses to provide an indication of the actual performance efficiency of the supervised operation.

17. A performance sensing system for computing an analog output indicative of the actual performance of a supervised operation as a function of a predetermined standard performance value comprising a sensor to provide an electrical signal representative of each unit of actual performance in the operation supervised by said sensing system, a monostable multivibrator having a stable state of operation and an unstable state of operation, including a pair of transistors, each said transistor having an input circuit and an output circuit, a cross-coupling circuit connected between the input circuit of each transistor and the output circuit of the other transistor, adjustable time constant circuitry in one of said cross-coupling circuits adapted to be adjusted as a function of said standard performance value so that said multivibrator circuitry in response to each said electrical signal applied thereto is switched from said stable state to said unstable state and in said unstable state produces an output pulse of a duration as determined by said time constant circuitry, means to apply said electrical signals to said multivibrator to produce said output pulses, a resistance-capacitance low pass filter connected to said multivibrator to receive said output pulses, said low pass filter having a time constant much greater than the duration of said output pulse, output circuitry including output terminals, a transistor amplifier connected between said low pass filter and said output terminals and a temperature compensating transistor connected to said output terminals to apply a correction to variations in the output produced by multivibrator transistors and said amplifier transistor, and means to record the totality of multivibrator output pulses as sensed by said low pass filter to provide an indication of the actual performance efficiency of the supervised operation.

References Cited by the Examiner

UNITED STATES PATENTS 2,922,940  1/1960  Mergler _____ 235—154

DARYL W. COOK, *Acting Primary Examiner.*

M. A. MORRISON, K. R. STEVENS,
*Assistant Examiners.*